Nov. 27, 1928.
M. SMITHEY
SIGNAL OR INDICATOR FOR MOTOR VEHICLES
1,693,555
Original Filed Oct. 10, 1921    2 Sheets-Sheet 1
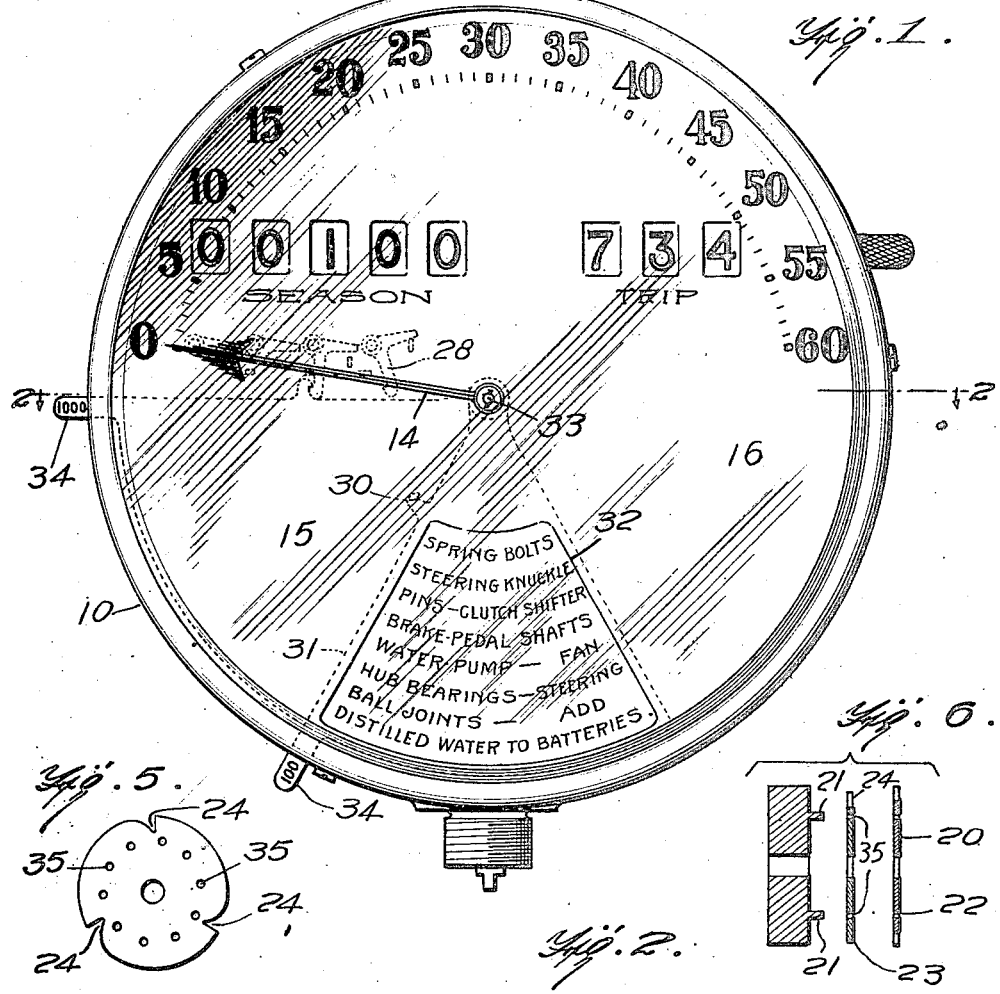
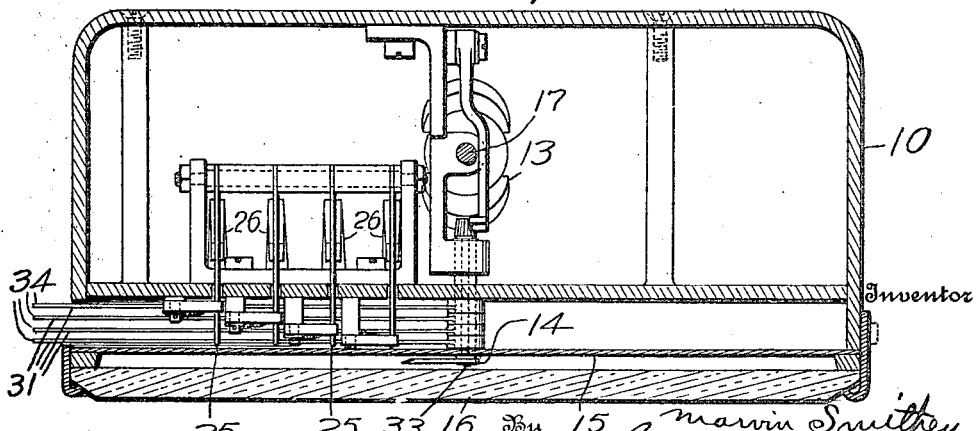
Inventor
Marvin Smithey
Attorney Nov. 27, 1928.
M. SMITHEY
1,693,555
SIGNAL OR INDICATOR FOR MOTOR VEHICLES
Original Filed Oct. 10, 1921   2 Sheets-Sheet 2
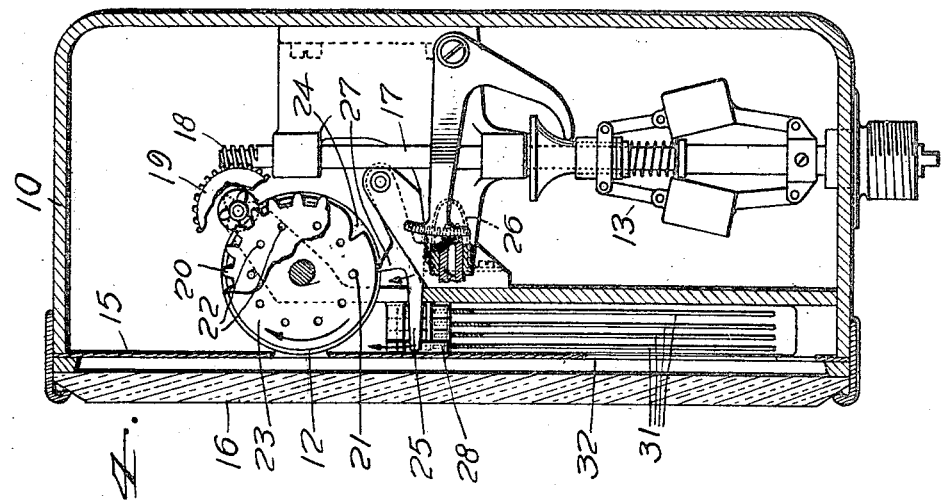
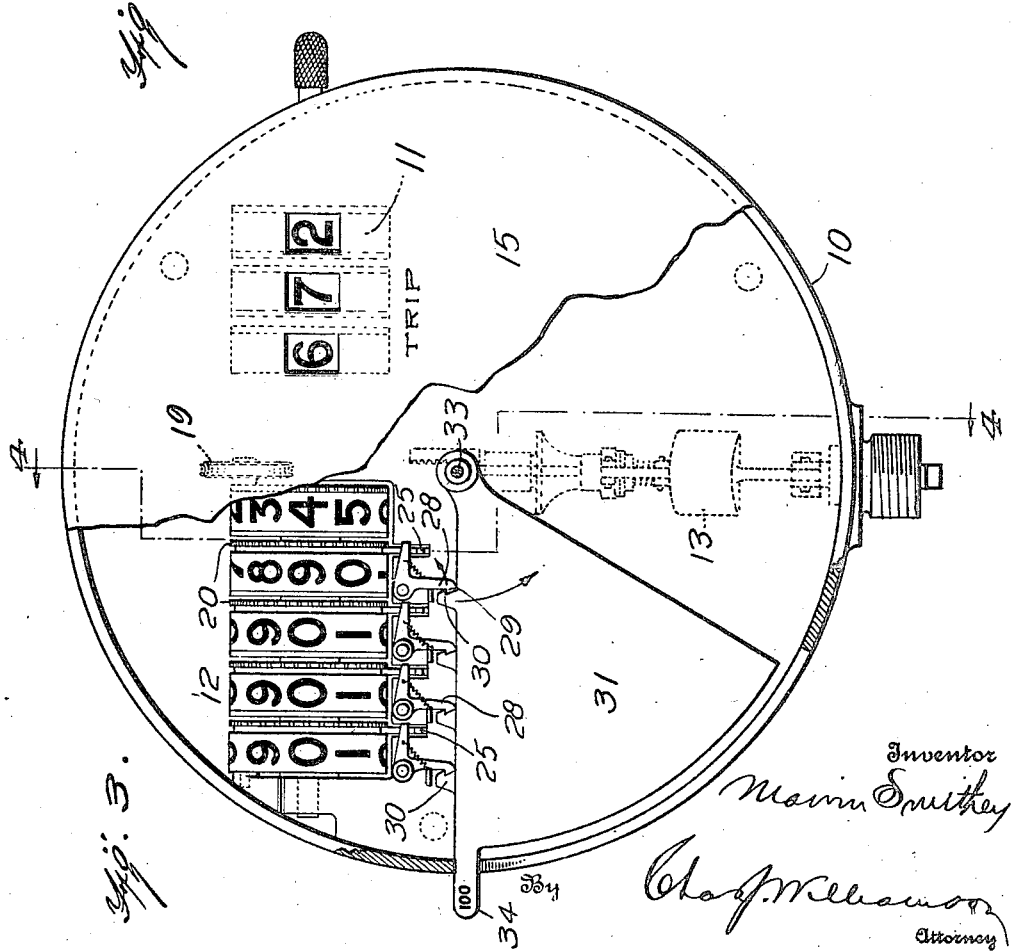

Patented Nov. 27, 1928.

1,693,555

UNITED STATES PATENT OFFICE.

MARVIN SMITHEY, OF LAWRENCEVILLE, VIRGINIA, ASSIGNOR TO L. P. SMITHEY AND NELLIE C. SMITHEY, BOTH OF ROANOKE, VIRGINIA.

SIGNAL OR INDICATOR FOR MOTOR VEHICLES.

Application filed October 10, 1921, Serial No. 506,594. Renewed January 3, 1925.

My invention relates to indicator or signal devices for motor vehicles, which, at appointed or set times, based upon the car mileage, will apprise the motorist or driver of the necessity of attending to requirements of the car that are important to be attended to for its proper upkeep and running condition. An object of my invention is to provide such a device of the utmost simplicity, and I attain this object mainly by controlling the display of the signals, (a number of which, obviously, are necessary), directly from the total mileage odometer forming a customary part of the car equipment. Another object of my invention is to avoid the necessity for the manufacture of a complete instrument for every type or kind of car, having reference to the fact that cars of different types have different requirements as to the time or the number of miles run by the car when lubrication or other needs of the car should be attended to, and I achieve this object by so constructing the indicator controlling devices that they may be applied to the odometer according to the special requirements of the particular type of car which is to be equipped with the device.

The embodiment of my invention shown in the drawing achieves the objects above stated and also secures other advantages which will be appreciated by those skilled in the art, but my invention is not restricted to such embodiment for it consists in what is described by or included within the scope of the appended claims.

In the annexed drawings:

Fig. 1 is a front elevation of a speedometer of familiar construction embodying my invention;

Fig. 2 is a horizontal section on the line 2—2 of Fig. 1;

Fig. 3 is a view similar to Fig. 1 with a portion of the cover or dial plate broken away;

Fig. 4 is a section of the line 4—4 of Fig. 3;

Fig. 5 is a detail side view of one of the signal controlling disks carried by the odometer wheels;

Fig. 6 is a detail view in section showing separated one of the odometer dial disks, the signal controlling disk associated therewith, and the gear wheel connected with said dial disk.

The speedometer shown in the drawings is of the type having a cylindrical casing, 10, which encloses the customary trip odometer, 11, the season or total mileage odometer, 12, and the centrifugal type speedometer operating mechanism, 13, which imparts movement to an index or pointer, 14, that coacts with a scale marked on the dial plate, 15, lying beneath the customary glass cover, 16. The odometers and speedometer receive their motion from a vertical shaft, 17, within the casing, 10, which, as usual, is connected by a flexible shaft or otherwise with the car wheel or driving shaft of the engine, motion being imparted to the odometers from the shaft, 17, by a worm, 18, on the shaft meshing with a worm wheel, 19, having the customary driving connection with the odometers. The odometers are of the side by side disk type, the disks carrying on their peripheries the usual numerals, and each disk having connected with it to rotate it, step by step, a spur gear, 20, which connection may, as shown in Fig. 6, be made of one or more studs, or pins, 21, projecting from one side of the disk and holes, 22, in the gear wheel, 20, into which said studs or pins project.

Also mounted on the dial disk studs or pins, 21, is a thin disk, 23, which at a desired number of points on its periphery has radial notches, 24, and for each disk, 23, and lying in the same plane therewith, is a trip lever or trigger, 25, that is normally pressed towards its disk, 23, by a spring, 26, and said lever having on its side next its disk a tooth, 27, which when a notch, 24, alines with the tooth permits the movement of the trigger by its spring, 26, in the direction to engage and release a catch, 28, in the form of a bell crank lever, one arm of which is in the path of such movement of the trigger while the other arm has a hook, 29, that engages a catch lug, 30, on a sector-shaped plate, 31, which is pivoted in the center of the instrument so that it may swing to and from a sector-shaped display slot or opening, 32, in the dial plate, 15, situated at the center of the lower half of the dial plate. Upon its outer side the signal plate, 31, is appropriately marked to call attention to an act to be done when it moves into display position which marking may be in the form of a legend of words of instructions. As the plate, 31, may be of thin sheet metal, a number of such plates can be employed, all hung from the same pivot, 33, and arranged one behind another, as clearly shown in Figs. 2 and 4. As each plate, 31, when in non-display position is raised or elevated above and to one side of the display opening, 32, it will be seen that when the latch of a plate is released, the plate will fall back by gravity into display position no spring being necessary to produce such movement and thus a simple and inexpensive construction is possible, although I do not restrict my invention to an arrangement which permits such a spring to be dispensed with. Each of the signal plates, 31, has projecting from it through a slot in the casing, 10, a tab or finger, 34, by means of which the plate may be lifted or moved from display position to non-display position, and on such finger, 34, may be marked an identification of the signal plate of which it is a part. The position of the fingers, 34, will indicate whether a signal has been moved to display position even if through inattention or neglect a previously displayed outermost signal plate should not have been restored to non-indicating position and in the case of the occupation of a display position by more than one signal plate, 31, each in turn after its instructions have been noted may be moved to non-display position uncovering any below that might have been concealed.

Each signal controlling disk, 23, is provided with a series of holes, 35, (see Fig. 5), for engagement with the dial disk pins or projections, 31, so that the angular position of the notch or notches, 24, which determine the time of the release of the appropriate signal plate, 31, may be selected, and thus the time of display of the signal on the mileage basis made to suit the particular car or type of car equipped with the device. I am thus able to make my device according to a fixed standard or model that is available for a great variety of cars whose lubrication or other requirements vary, all of the parts of the signal device being thus possible of manufacture regardless of the particular type of car with which it is to be used, it being necessary merely to position the signal controlling disk in view of the special requirements of the car as to the time or mileage when lubrication or other acts must be performed.

What I claim is:

1. A warning or signal device for motor vehicles including a movable signal member, means for the display of the signal operating on a mileage basis comprising a control element adapted to be secured in any one of a plurality of operative positions and means that positively secure said element in each of said several positions and member resetting means.

2. A warning or signal device for motor vehicles including a movable signal member, a latch device comprising cooperative members holding said member in non-display position, a rotatable control element for said latch device, means for revolving said member in correspondence with the car mileage with which said member may be connected in any one of a plurality of positions and means that positively secure said element in each of said several positions and member resetting means.

3. A warning or signal device for motor vehicles including a movable signal member, and means for the display of the signal operating on a mileage basis comprising an odometer and a control element at the side of one of the odometer wheels and shiftable rotatably to various positions whereby the mileage period may be varied and member resetting means.

4. A warning or signal device for motor vehicles including a movable signal member, and means for the display of the signal operating on a mileage basis comprising an odometer and a control element at the side of one of the odometer wheels and shiftable rotatably to various positions, comprising a disk with a notch in its periphery, whereby the mileage period may be varied and member resetting means.

5. A warning or signal device for motor vehicles comprising a total mileage odometer, a movable signal carrying member movable to and from display position and resettable from display position, and means under the control of the total mileage odometer for effecting the display of said member, comprising a disk adjacent one of the odometer wheels, means to secure said disk in any one of several positions relative to said wheel and a member that cooperates with said disk and member resetting means.

6. A warning or signal device for motor vehicles comprising a plurality of sector-shaped signal-carrying members situated in parallel planes and having a common axis of oscillation, a casing having a common display opening to and from which said members are movable, automatic means for effecting the movement of said members to said display opening when the vehicle has run predetermined mileages and member resetting means.

In testimony whereof I hereunto affix my signature.

MARVIN SMITHEY.